United States Patent Office 3,320,223
Patented May 16, 1967

3,320,223
RECOVERY OF α-OLEFIN POLYMERS FROM POLYMERIZATION REACTION PRODUCT
Donald E. Moore, Coleman, and Aaron E. Prout, Rosebush, Mich., assignors to The Dow Chemical Company, Midland, Mich., a corporation of Delaware
No Drawing. Filed July 5, 1962, Ser. No. 207,772
5 Claims. (Cl. 260—88.2)

This invention relates to the recovery of α-olefin polymers from their polymerization mixtures in organic solvents.

The production of α-olefin polymers can advantageously be carried out by reacting a monomer or monomers and organometallic catalysts in the presence of a hydrocarbon solvent. Suitable catalyst systems include mixtures of a trialkyl aluminum compound and a compound of a heavier metal of the group IV–B, V–B or VI–B of the Periodic System of the elements. A large number of alkyl aluminum compounds are operable including aluminum trimethyl, aluminum triethyl, aluminum tripropoyl, aluminum triisobutyl, dialkyl aluminum halides and dialkyl aluminum hydrides. Salts of titanium, zirconium, vanadium, uranium, thorium and chromium are oftentimes preferred as the groups IV–B, V–B or VI–B metallic compounds in the catalyst systems, although salts of the remaining metals in these subgroups may also be employed. Such polymers are well described in the literature. Polyolefin Resin Processes by Marshall Sittig, published in 1961 by the Gulf Publishing Company, Houston, Texas gives a description of the composition and preparation of these types of polymers.

In the polymerization processes, inert organic liquids are often employed as reaction media. Suitable media include liquid aliphatic, alicyclic and aromatic hydrocarbons with low to medium boiling ranges. Specific examples are propane, butane, pentane, hexane, heptane, cyclohexane, alkylated cyclohexane, benzene, toluene, kerosene and diesel oil.

The reaction products, being soluble in some of the polymerization solvents, sometimes form viscous final reaction mixtures from which the polymer can be precipitated by non-solvents such as alcohols, ketones and the like. However, the precipitated products are highly solvated, tend to agglomerate and tenaceously retain the solvent during drying. The usual method of separating the polymer from the solvent is by vacuum devolatilization. However, the elevated temperature necessary to effect the devolatilization causes degradation of the polymer. This latter process also results in leaving in the polymer all of the solvent-insoluble impurities which cause deleterious effects in the finished product such as cavities in an injection molded article due to vaporization of impurities during heating and discoloration.

An object of this invention is to provide an α-olefin polymer of improved quality.

A further object is to provide an improved method of recovery of α-olefin polymers from their polymerization mixtures in organic solvents.

A still further object is to provide an improved method of treating raw polymerization reaction product to separate the polymer from solvent and impurities.

Various other objects, advantages and features of the invention will become apparent from the following detailed description.

The objects of this invention are attained in an improved process in which the product of polymerization of a monomer in an inert liquid diluent solvent in the presence of an organometal catalyst in known manner as set forth hereinbefore is withdrawn from the polymerization reaction zone and passed into an emulsification zone where an emulsion of the reaction product is formed by agitation following the addition of water, a ketone and an emulsifying agent. The resulting emulsion is passed into a first treating zone where the polymer is precipitated by successive additions of a ketone with decantation between each such addition. The ketone-wet polmer is passed into a second treating zone where the residual ketone is removed by washing with water. The water-wet polymer is finally passed into a drying zone where the water is removed by oven or air drying.

The steps of the improved process are shown schematically as follows:

| Monomer Solvent Catalyst |
|---|
| Reaction Step |
| Emulsification Step |
| First Treating Step |
| Second Treating Step |
| Drying Step |
| Dry Polymer Product |

The novel polymer recovery process described above has the advantage over the usual vacuum devolatilization recovery process in that in the process of the invention the polymerization reaction product is not subjected to temperatures above the melting point of the polymer, which temperatures tend to degrade the polymer. The new process also yields a polymer of improved purity since the emulsion treatment exposes the polymer to both water and solvent, resulting in the removal of both water-soluble and solvent-soluble impurities.

The presence of the emulsifying agent in the system results in the formation of a fine dispersion of the polymerization reaction product in the emulsion allowing intimate contact between the particulate polymer and the ketone washing solution. Thus, a complete separation of polymer and solvent is achieved. In the absence of an emulsifying agent, only a slight amount of emulsification can be obtained and separation of the emulsion into its component phases is rapid upon standing. Also the polymer particles tend to agglomerate in the emulsion system that does form resulting in less intimate contact of polymer and washing solution and hence an incomplete removal of solvent and impurities from the polymer.

The process of the invention may be carried out by mixing only water and an emulsifying agent with the polymer slurry to form an emulsion from which the polymer is subsequently precipitated by the addition of a ketone. However, the quantity of the polymer slurry which can be mixed into this type of emulsion before causing the emulsion to break is rather limited. A preferred method of operation is to add either a ketone, additional hydrocarbon solvent or both to the emulsion system. This reduces the viscosity of the system allowing a greater quantity of polymer slurry to be incorporated into a unit quantity of emulsion, thus increasing the ultimate quantity of dry polymer recovered from a unit quantity of treatment solution.

One method of operation within the scope of this invention is to prepare a preliminary emulsion with water, emulsifier, hydrocarbon solvent and ketone. The polymer slurry is then blended into the emulsion. The remainder of the procedure is carried out as explained above wherein the resulting emulsion is treated with successive additions of a ketone with decantation between each such addition to remove the solvent.

*Example 1*

A copolymer of ethylene and propylene was formed by reacting a mixture of ethylene and propylene monomers in the presence of a catalytic mixture of aluminum triethyl and titanium tetrachloride dispersed in xylene. The reaction product contained 11% by weight copolymer in solution in xylene. In a separate vessel, 285 ml. water, 200 ml. acetone, 58 ml. xylene and 1.0 ml. of an emulsifying agent, a polyoxyethylene sorbitol ester of mixed fatty and resin acids, were combined and agitated to form an emulsion. To the resulting emulsion, 500 ml. additional acetone and 1500 grams of the above-mentioned ethylene-propylene copolymer solution in xylene were added. A thick creamy emulsion formed in which the copolymer was well dispersed. The copolymer was precipitated from the emulsion by a series of six successive additions of acetone with decantation between additions. After each of the first three additions, three layers were formed when the emulsion was allowed to stand. The top layer was rich in the xylene solvent, the intermediate layer contained the polymer and the bottom layer was aqueous. After each of the last three such additions, only two layers formed which corresponded to the top and intermediate layers described above. No aqueous layer formed. When three layers formed, both the top and bottom layers were decanted and the intermediate layer retained. When only two layers formed, the top layer was decanted and the bottom layer retained. The following table shows the amount of each layer decanted after each addition of acetone.

TABLE
[Volume Liquid Decanted During the Liquid-Solids Extraction]

| Addition of Acetone | Volume Decanted (ml.) | |
|---|---|---|
| | Top Layer | Bottom Layer |
| First, 274 ml | 1,200 | 100 |
| Second, 300 ml | 370 | 100 |
| Third, 300 ml | 400 | 100 |
| Fourth, 300 ml | 300 | 0 |
| Fifth, 500 ml | 500 | 0 |
| Sixth, 500 ml | 500 | 0 |

After the last decantation, a finely divided acetone-wet polymer was obtained. Residual acetone was removed by washing with water. The water was then removed from the polymer by drying in an oven. The finished particulate polymer product was free of xylene solvent and other contaminants.

Emulsifying agents operable in this invention include the anionic type surface active agents such as alkyl aryl sulfonates, fatty alcohol sulfates, sulfated and sulfonated amides and amines, sulfated and sulfonated esters and ethers and alkyl sulfonates; the nonionic type surface active agents such as the condensation products of fatty acids, alcohols, esters, aldehydes, amides, amines or phenolic compounds having lateral chains with ethylene oxide and/or propylene oxide; and the cationic surface active agents such as primary, secondary and tertiary amines and quaternary ammonium compounds.

Suitable ketones which may be used to separate the polymer from its polymerization solvent include the aliphatic and alicyclic ketones which are at least partially soluble in water such as acetone, methyl ethyl ketone, methyl n-propyl ketone, methyl isopropyl ketone, ethyl n-butyl ketone and cyclopentanone.

While the foregoing description has been concerned mainly with the recovery of copolymers of ethylene and propylene from their polymerization reaction mixtures, it should be pointed out that the invention is not limited to such polymer products but is equally applicable to homopolymers and copolymers of ethylene, propylene, butylene and the other α-olefin compounds.

What is claimed is:

1. A process for the recovery of α-olefin polymers from their polymerization reaction mixture in organic solvents and containing an organometallic polymerization catalyst mixture of an alkyl aluminum compound and a compound of a metal selected from the class consisting of metals of Groups IV-B, V-B and VI-B of the Periodic System of the Elements by forming an emulsion comprising the polymerization mixture containing the polymer, organometallic catalyst, organic solvent, water and an emulsifying agent; mixing such emulsion with a ketone which is at least partially soluble in water to precipitate the polymer from the emulsion; and separating the polymer therefrom.

2. The process of claim 1 wherein the ketone is acetone.

3. In a process for the recovery of α-olefin polymers from their polymerization reaction mixture in organic solvents and containing an organometallic polymerization catalyst mixture of an alkyl aluminum compound and a compound of a metal selected from the class consisting of metals of Groups IV-B, V-B and VI-B of the Periodic System of the Elements, the steps of forming a preliminary emulsion comprising water, a liquid organic solvent selected from the class consisting of liquid aliphatic, alicyclic and aromatic hydrocarbons, and an emulsifying agent selected from the class consisting of nonionic, anionic and cationic surface active agents; blending into such preliminary emulsion the polymerization mixture containing the polymer, organometallic catalyst, and organic solvent; mixing such emulsion with a ketone which is at least partially soluble in water to precipitate the polymer from the emulsion; and separating the polymer therefrom.

4. In a process for the recovery of α-olefin polymers from their polymerization reaction mixture in organic solvents, and containing an organometallic polymerization catalyst mixture of an alkyl aluminum compound and a compound of a metal selected from the class consisting of metals of Groups IV-B, V-B and VI-B of the Periodic System of the Elements, the steps of forming a preliminary emulsion comprising water, a ketone which is at least partially soluble in water and an emulsifying agent selected from the class consisting of nonionic, anionic and cationic surface active agents; blending into such preliminary emulsion the polymerization mixture containing the polymer, organometallic catalyst, and organic solvent; mixing such emulsion with a ketone which is at least partially soluble in water to precipitate the polymer from the emulsion; and separating the polymer therefrom.

5. In a process for the recovery of α-olefin polymers from their polymerization reaction mixture in organic solvents and containing an organometallic polymerization catalyst mixture of an alkyl aluminum compound and a compound of a metal selected from the class consisting of metals of Groups IV-B, V-B and VI-B of the Period System of the Elements, the steps of forming a preliminary emulsion comprising water, a ketone which is at least partially soluble in water, a liquid organic solvent selected from the class consisting of liquid aliphatic alicyclic and aromatic hydrocarbons, and an emulsifying agent selected from the class consisting of nonionic, anionic and cationic surface active agents; blending into such preliminary emulsion the polymerization mixture containing the polymer, organometallic catalyst, and organic solvent; mixing such emulsion with a ketone which is at least partially soluble in water to precipitate the polymer from the emulsion; and separating the polymer therefrom.

References Cited by the Examiner

UNITED STATES PATENTS

| | | | |
|---|---|---|---|
| 2,983,720 | 5/1961 | Leary | 260—94.90 |
| 3,014,019 | 12/1961 | Czenkusch | 260—94.90 |
| 3,071,556 | 1/1963 | Cassar et al. | 260—94.90 |
| 3,111,498 | 11/1963 | Ray | 260—29.7 |

JOSEPH L. SCHOFER, *Primary Examiner.*

F. L. DENSON, *Assistant Examiner.*